Jan. 12, 1954 J. W. HARDY 2,665,793
CONVEYER MISALIGNMENT SIGNAL
Filed Feb. 18, 1950
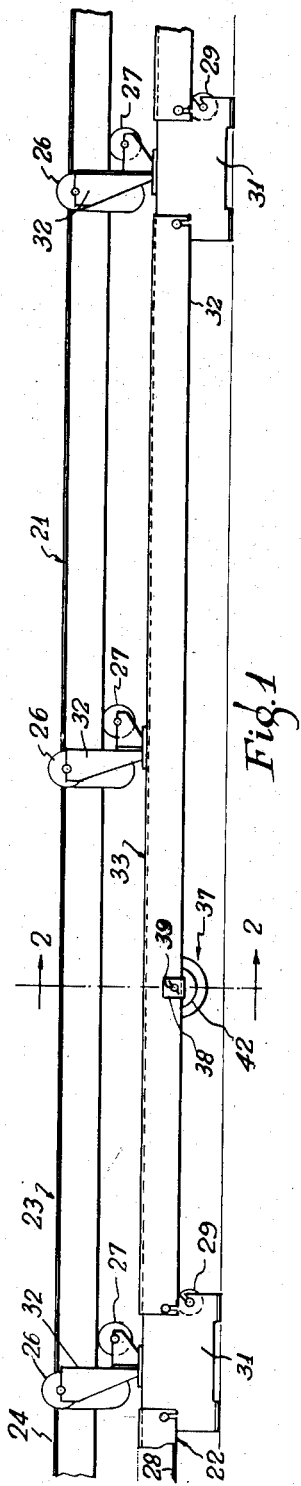
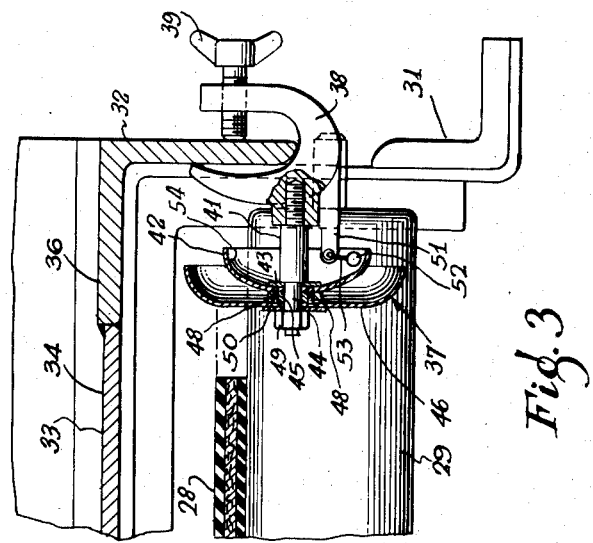
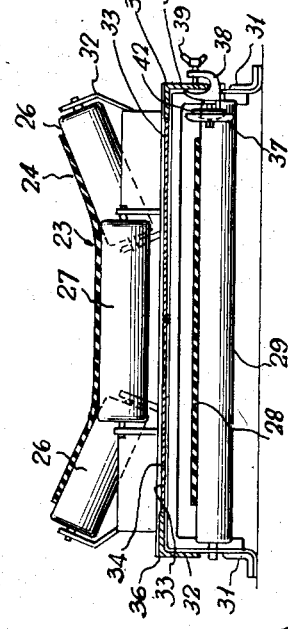
INVENTOR.
James W. Hardy
BY
Clarence F. Poole
ATTORNEY Patented Jan. 12, 1954

2,665,793

UNITED STATES PATENT OFFICE 2,665,793

CONVEYER MISALIGNMENT SIGNAL

James W. Hardy, Chicago, Ill., assignor to Goodman Manufacturing Company, Chicago, Ill., a corporation of Illinois Application February 18, 1950, Serial No. 145,031

5 Claims. (Cl. 198—40)

This invention relates to conveyors of the endless belt type and more particularly to means for generating a signal whenever the belt becomes misaligned with respect to the frame.

A conveyor of this type generally employs an endless rubberlike belt supported on rollers carried in an elongated frame. The top strand or reach is supported in a trough-like configuration by means of flat middle rollers and a pair of outer inclined rollers. The bottom strand or reach is supported on flat rollers and is completely covered by a metal shell or shield to prevent spillage of material onto it. It often happens that such belt conveyors are exposed to abusive service conditions under which some of the stands supporting the rollers become displaced, causing one edge or the other of the lower reach to ride over laterally and rub against the displaced stand or stands. Under such conditions an entire belt can be destructively abraded and ruined if the condition is not remedied. This is a serious problem due to the expense and down-time involved in repairing the belt and the situation is aggravated by the fact that the lower reach is covered by the shell which must be removed before the exact location of the misalignment can be determined. It will be readily appreciated that locating a single point of misalignment in a conveyor extending over several hundred or several thousand feet can be a major job although normally, in underground mine conveyors and the like, the repair crew will be guided by the probability that such misalignment has occurred at one or more of the loading stations.

It is, therefore, a principal object of the present invention to provide a simple means for indicating misalignment of the lower reach as soon as it occurs and for indicating the exact location of the misalignment so it may be corrected with a minimum of down-time and damage to the belt.

Other objects and disadvantages will be seen in the following description taken in connection with the figures of the drawing in which:

Figure 1 is a fragmentary side view of a belt conveyor employing one embodiment of the present invention; Fig. 2 is a transverse cross sectional view of Fig. 1 taken along the lines 2—2; and Fig. 3 is a detailed enlargement of the portion of Fig. 2 showing the novel signal means.

Referring now more particularly to the drawing, a conventional belt conveyor, generally indicated 21, is shown. The conveyor comprises frame means, generally indicated 22, and an endless rubber-like belt 23 having an upper reach or strand 24 supported on troughing rollers 26, 27, 26 and a lower reach 28 supported on horizontal rollers 29. The rollers are supported on that portion of the frame means comprising inverted U-shaped stands 31 and frameworks 32 carried atop the stands. It will be noted that the middle troughing rollers 27 are horizontal and the outer rollers 26 are inclined to impart a trough-like, load-carrying configuration to the upper reach while the lower reach is supported, at greater intervals, on the series of single horizontal rollers 29.

The frame means 22 also includes a protective shell or cover means generally indicated 33 and consisting of a series of longitudinally-abutting half shells, each made up of a plate 34 and reinforcing angle member 36, the latter being pivotally mounted at its opposite ends or succeeding stands 31. It will also be observed that one of the troughing roller groups 26, 27, 26 is supported atop the protective shell 33 between succeeding stands 31.

So far the system described is conventional.

Directing attention now to the novel misalignment indicator generally designated 37, the particular embodiment shown comprises a U-shaped clamp 38 held by thumb screw 39 onto the vertical wall of one of the angle members 36 at any desired location between stands 31, 31. An inwardly extending rod 41, threadedly engaged in this instance with the clamp member, functions as a support for rotatable bell means 42. The latter, in this instance, is constructed in a more-or-less conventional concavo-convex configuration. Near its end, the rod 41 is provided with a shoulder engaging washer 43 against which the bell 42 is assembled. On a reduced diameter end extension 44 of the rod is rotatably mounted the bell 42. Connected to the latter, by screws 48, for rotation therewith, are a spacing washer 45 and a concavo-convex belt-engaging member 46, all being held on the end of the rod by means of washer 50 and nut 49. The belt engaging member 46 is effective to rotatably drive the bell when the former is engaged by the belt, as shown in dotted lines in Fig. 3.

Another inward extension of the clamp 38 is indicated by the numeral 51 and carries at the end thereof a striker member 52 hanging loosely on link 53 in striking engagement with an inner boss 54 formed in the bell member. Thus it will be seen that upon relative rotation between the bell and striker a series of warning sounds or gongs will be emitted drawing attention of those in the vicinity to the fact that the belt has become misaligned with respect to the frame. The alarm will also fix the exact point of misalignment.

In use the alarm units 37 will be disposed on both sides of the conveyor and at intervals along the length of the conveyor where it is considered likely that misalignment may occur. As a practical matter, for example in underground work in mines, the greatest danger of misalignment occurs at loading points where shuttle cars are repeatedly driven up to the belt for discharge of their contents thereon. In many particular installations the alarm units may be installed only in the vicinity of such loading points for the protection desired.

While I have described in detail a single embodiment of my invention which I have found to be convenient and practical, I do not wish to be understood as limiting myself to the exact detailed construction shown, as obviously many structural changes may be made within the scope of my invention. For example, while I have shown a stationary striker means and a rotatable bell, obviously the reverse would function satisfactorily. Furthermore, while I have shown a unit which is rotatable responsive to engagement by the misaligned belt to generate an audible signal, likewise a unit which moves in any other manner to generate the signal would fall within the spirit of this invention.

I claim:

1. In a belt conveyor having upper and lower reaches of an endless belt supported on rollers carried by a frame, said lower reach normally moving in a preselected position spaced laterally from the sides of the frame, means for providing a signal indicating misalignment of the lower reach of said belt comprising a support shaft mounted on said frame, a bell and belt engaging means spaced from said bell and mounted for rotation on said support shaft when said belt engaging means contacts said lower reach upon misalignment thereof, and a striker adapted to contact said bell upon rotation of said bell whereby an audible indication is given of misalignment of said lower reach.

2. In a belt conveyor having upper and lower reaches of an endless belt supported on rollers carried by a frame, said lower reach normally moving in a preselected position spaced laterally from the sides of the frame, means for providing a signal indicating misalignment of the lower reach of said belt comprising a shaft mounted on said frame for supporting belt engaging means adapted to contact said lower reach upon misalignment thereof and to rotate on said shaft, and a bell having striker means cooperating therewith, said bell and said striker means being supported by said shaft for rotation relative to each other upon rotation of said belt engaging means whereby an audible indication is given of misalignment of said lower reach.

3. In a belt conveyor having upper and lower reaches of an endless belt supported on rollers carried by a frame, said lower reach normally moving in a preselected position spaced laterally from the sides of the frame, means for providing a signal indicating misalignment of the lower reach of said belt comprising a clamp secured to said frame, a support shaft extending from said clamp, a bell and belt engaging means spaced from said bell and mounted for rotation on said support shaft when said bell engaging means contacts said lower reach upon misalignment of said lower reach, and a striker adapted to contact said bell upon rotation of said bell whereby an audible indication is given of misalignment of said lower reach.

4. In a belt conveyor having upper and lower reaches of an endless belt supported on rollers carried by a frame, said lower reach normally moving in a preselected position spaced laterally from the sides of the frame, means for providing a signal indicating misalignment of the lower reach of said belt comprising a clamp secured to said frame, a shaft extending from said clamp for supporting belt engaging means adapted to contact said lower reach upon misalignment thereof and to rotate on said shaft, and a bell having striker means cooperating therewith, said bell and said striker means being supported by said shaft for rotation relative to each other upon rotation of said belt engaging means whereby an audible indication is given of misalignment of said lower reach.

5. In a belt conveyor having upper and lower reaches of an endless belt supported on rollers carried by a frame, said lower reach normally moving in a preselected position spaced laterally from the sides of the frame, means for providing a signal indicating misalignment of the lower reach of said belt comprising belt engaging means mounted to contact said lower reach upon misalignment thereof and to be rotated upon such misalignment, a bell and a striker therefor arranged for relative rotation with respect to each other upon rotation of said belt engaging means to give an audible signal indicating misalignment of said lower reach.

JAMES W. HARDY.

References Cited in the file of this patent

UNITED STATES PATENTS

| Number | Name | Date |
|---|---|---|
| 1,770,957 | Veale | July 22, 1930 |
| 2,075,111 | Gulliksen et al. | Mar. 30, 1937 |